United States Patent
Willems

(10) Patent No.: US 6,694,510 B1
(45) Date of Patent: *Feb. 17, 2004

(54) COLLECTION DRIVER FOR COLLECTING SYSTEM DATA USING RECORD BASED REQUESTS WITH TAG LISTS AND PAUSING ALL BUT ONE THREAD OF A COMPUTER SYSTEM

(75) Inventor: Richard A. Willems, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 546 days.

This patent is subject to a terminal disclaimer.

(21) Appl. No.: 09/706,050

(22) Filed: Nov. 3, 2000

(51) Int. Cl.[7] .................................................. G06F 9/44
(52) U.S. Cl. ....................... 717/124; 717/139; 711/100; 711/117
(58) Field of Search ................................ 717/124, 125; 711/100, 117

(56) References Cited

U.S. PATENT DOCUMENTS

| | | | | |
|---|---|---|---|---|
| 5,630,049 A | * | 5/1997 | Cardoza et al. ................ 714/25 |
| 5,889,988 A | * | 3/1999 | Held ........................... 709/103 |
| 5,956,479 A | * | 9/1999 | McInerney et al. ........... 714/38 |
| 6,158,045 A | * | 12/2000 | You ............................. 717/124 |
| 6,205,494 B1 | * | 3/2001 | Williams ........................ 710/5 |
| 6,272,499 B1 | * | 8/2001 | Wooten ....................... 707/102 |
| 6,370,660 B1 | * | 4/2002 | Mann ........................... 714/38 |
| 6,564,369 B1 | * | 5/2003 | Hove et al. ................. 717/121 |

OTHER PUBLICATIONS

Aho, Alfred V., Sethi, Ravi, Ullman, Jeffrey D., "Compilers Principles, Techniques, and Tools", pp. 432–433, 439, 446–449, and 703–711. 1986 Bell Telephone Laboratories, Inc. / Addison–Wesley.*

Aral, Ziya, Gertner, Ilya, Schaffer, Greg, "Efficient Debugging Primitives for Multiprocessors", p. 87–95, Apr. 1989, retrieved fro ACM Portal database Jun. 24, 2003.*

Schultz, Daniel, Mueller, Frank, "A Thread–Aware Debugger with an Open Interface", p. 201–212, Aug. 2000, retrieved from ACM Portal Jun. 24, 2003.*

Filipski, Alan, "A Case Study in Software Portability: The UNIX Symbolic Debugger", p. 85–95, 1985 ACM, retrieved from ACM Portal database Jun. 24, 2003.*

* cited by examiner

Primary Examiner—Wei Zhen
Assistant Examiner—Mary Steelman

(57) ABSTRACT

A method for parsing a linked list to extract data therefrom includes the step of constructing a record list having a list element descriptor descriptive of data to be retrieved from a linked list. The method also includes the steps of following a list head locator of the list element descriptor to a head of the linked list, following links to a node of the linked list, interpreting a tag of the list element descriptor to locate data of the node, and extracting data from the node.

13 Claims, 8 Drawing Sheets

LOCAL

SYMBOL LIBRARY STRUCTURE

WINDOWS NT/2000 PROCESS LIST STRUCTURE

KNOWN ART

INPUT RECORD LIST STRUCTURE

SCALAR MEMORY DESCRIPTOR

LIST MEMORY DESCRIPTOR

LIST ELEMENT DESCRIPTOR

TAG

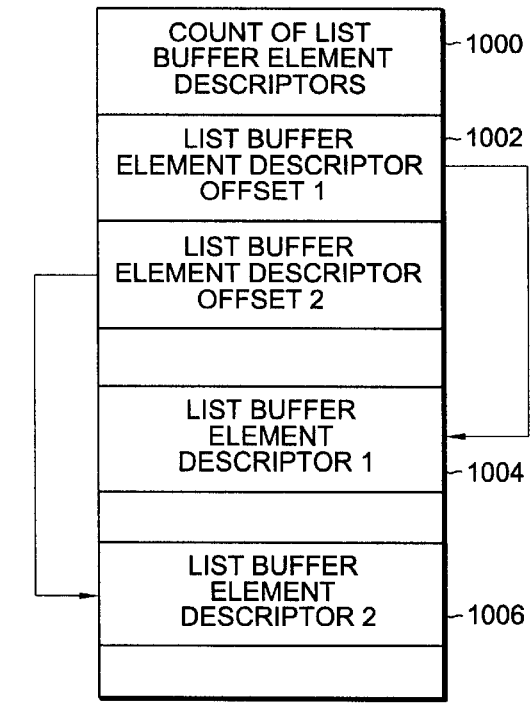
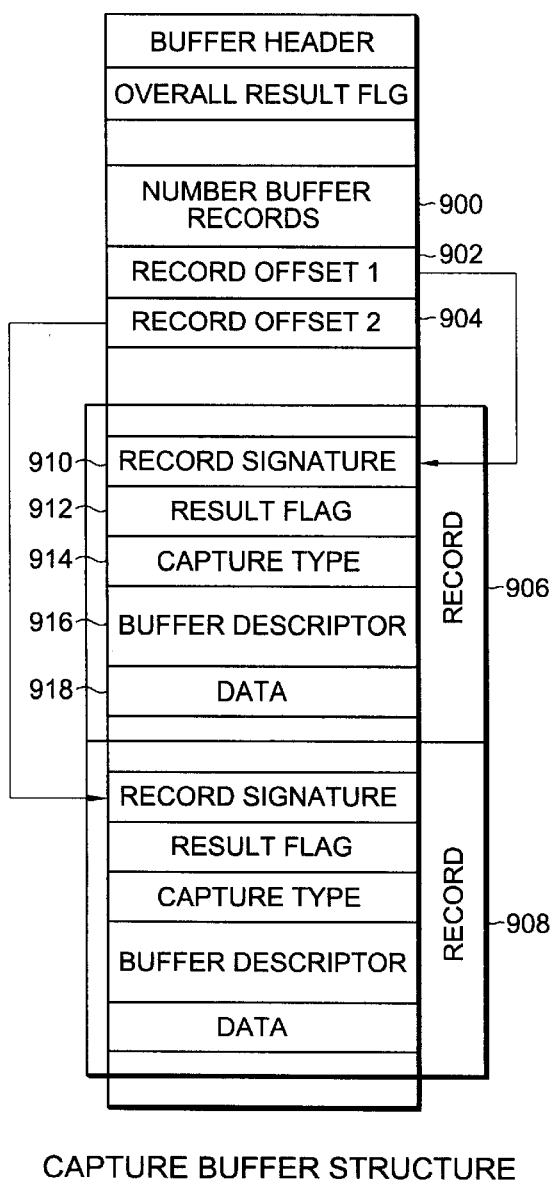
CAPTURE BUFFER STRUCTURE
Fig. 9
LIST BUFFER DESCRIPTOR
Fig. 10
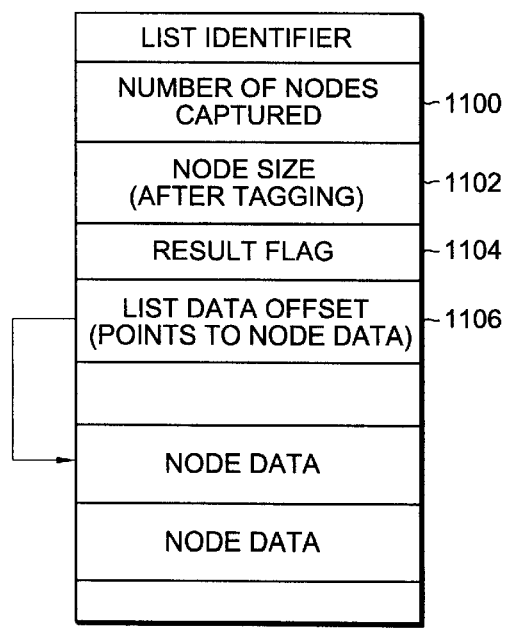
LIST BUFFER ELEMENT DESCRIPTOR
Fig. 11

COLLECTION DRIVER FOR COLLECTING SYSTEM DATA USING RECORD BASED REQUESTS WITH TAG LISTS AND PAUSING ALL BUT ONE THREAD OF A COMPUTER SYSTEM

RELATED APPLICATIONS

This application is related to a simultaneously filed application entitled "System and Method for Collecting System Data Using Automatically Identified Symbol Libraries to Create Record Based Requests with Tag Lists of Data to be Collected Upon Pausing All But One Thread of an Operating Computer System", identified as Ser. No. 09/706.176. This application is also related to a simultaneously filed application entitled "System and Method for Collecting System Data Using Record Based Requests with Tag Lists and Pausing All But One Thread of a Computer System", identified as Ser. No. 09/706,076.

FIELD OF THE INVENTION

The invention is related to the field of interactive debuggers for computer operating systems. In particular, the invention is related to the field of formatting requests for system information by a debugger's user interface to control capture of list information by the debugger's collection driver.

BACKGROUND OF THE INVENTION

Many modern computer systems, including their resident operating systems and application programs have software bugs, or may have or develop other problems that cause maloperation. When maloperation occurs, it is desirable to identify any causative bugs or other problems so that repairs may be made to prevent future maloperation. Symbolic debuggers may be used by trained service personnel to examine variables of a maloperating computer system to help those personnel identify any causative bug or other problem.

Software bugs may exist in the operating system itself or in application programs. Viruses may enter the system and cause various levels of damage, leading to maloperation. Other problems that can cause maloperation include hardware defects, malfunctions of attached devices and networked computer systems, and maliciously or accidentally incorrect user input.

Debugging is often an iterative process of information gathering, making changes or performing other experiments, and testing. A symbolic debugger is a tool highly useful for at least the information gathering phase of this process, and occasionally useful for performing experiments and testing.

Symbolic kernel debuggers are symbolic debuggers having command sets and functions particularly suited to solving software bugs and problems associated with an operating system kernel or software drivers, such as input/output device drivers that run in kernel mode.

Symbolic kernel debuggers are often used to diagnose intermittent bugs in systems. Debugging intermittent problems requires that the failure state of the intermittent bug be reproduced, then the debugger may be used to examine information relevant to the bug. Reproducing intermittent bugs can be difficult and time consuming, sometimes requiring extensive repetition of test sequences to induce the failure state.

Symbolic Debuggers and Symbol Resolution

Symbolic debuggers, including symbolic kernel debuggers, typically incorporate a collection driver, a user interface, and a symbol resolution system.

The symbol resolution system reads a module-specific symbol file, typically generated by an assembler, compiler or linker when the module was created, to obtain a list of known symbols and relative or absolute addresses corresponding to those symbols. The symbol resolution system uses this list to translate symbolic requests by service personnel into memory addresses having variables to be read or function entry points to be called or intercepted. The symbol file may also specify a variable type associated with each symbol, which may control the way the user interface displays memory data.

Symbolic kernel debuggers may have the ability to parse system information, such as process lists and input/output buffers and to display relevant information. The symbol resolution system is often used by these debuggers to locate those lists and buffers since those lists and buffers may appear at different locations in memory for each version of the kernel or driver software.

It is essential that the version of the symbol file used by the symbol resolution system correspond to the version of the module running on the machine being debugged. If this is not the case, the debugger may read different locations than those intended, which can result in user confusion or a crashed debugger. Since operating modules are updated frequently, with service packs and in-line updates as well as with new operating system releases, locating, storing, and ensuring use of the correct symbol file can be a difficult exercise. Kernel-mode driver modules may also be released, patched, and updated, by hardware vendors; further complicating the logistical problem of ensuring use of the correct symbol file.

The collection driver typically gathers data as requested by service personnel, and, may, but need not, also have the ability to alter selected memory locations. The collection driver runs on the target machine, the machine being diagnosed. Some symbolic kernel debuggers are known to utilize a serial port of the target machine to communicate with a diagnosis machine upon which runs the user interface and symbol resolution system.

The user interface typically interfaces the collection driver and the symbol resolution system to a keyboard and display for interaction with service personnel users. The user interface may include system-specific code for reading linked-lists, including process lists, and displaying information from those lists to the user. Extraction of data from linked lists typically requires multiple calls from the user interface to the collection driver.

Coherency of Data

When an operating system runs on a machine, it is known that many operating system variables and data structures change as the system runs. Many of these data structures are of length greater than the word length of the machine; changes made to these structures must take place over several processor operations. If these data structures are examined by a debugger after the first operation of a change, but before the last operation of the change, the data captured or viewed by the debugger may not accurately reflect the state of the system. Similarly, if a debugger begins to view or capture a data structure prior to a change, but completes capture after the change, the data captured or viewed will be incoherent in that it does not accurately reflect the state of the system.

Incoherent data may cause confusion to service personnel attempting to interpret it. Since no indication of incoherency exists, it can be difficult to determine whether a problem indicated by the data is because the data is incoherent, or because the data indicates a problem with the system.

Incoherent data may cause a debugger to display erroneous information. If incoherent data is followed as part of a linked list, the debugger may crash or attempt an illegal operation. For example, if links of a doubly linked list are examined after update to the forward links, but before update to the reverse links, the reverse links are incoherent and could result in a debugger crash if the debugger follows them. Debugger crashes may not only require that the debugger be restarted, but may require extensive work to reproduce the failure state of an intermittent bug.

It is desirable that captured data accurately reflect system state, or be "coherent," so that service personnel may diagnose the system without confusion, wasted effort following false leads, and without losing time to restarting crashed debuggers and reproducing bugs.

Some existing symbolic kernel debuggers ignore the problem of incoherent data. A debugger believed to ignore incoherency when taking a system snapshot is MICROSOFT i386KD running under LiveKD by SysInternals, as distributed with the book: Inside WINDOWS 2000 3'd ed. by David Solomon and Mark Russiovich, MICROSOFT Press, 2000. Other debuggers such as MICROSOFT's i386KD without LiveKD enforce partial coherency by stopping execution of all programs, except for the debugger, on the target machine until debugging is complete. Stopping execution renders the target machine temporarily unusable, disrupting any real-time control functions or network services provided by that machine. Stopping execution prevents the operating system from making changes to data structures while the debugger is capturing or displaying those structures thereby preventing apparent incoherency resulting from updates to these structures as the debugger is reading them. Unless execution is stopped at a time when no changes to data structures are in progress, some incoherency may, however, exist.

It can be useful to obtain a snapshot of coherent state information about a system, allow that system to continue execution for some time, and obtain a second snapshot from that system. This permits service personnel to observe how the system state changes with time, which can yield useful clues about system bugs and other problems. In particular, multiple snapshots can be useful in identifying memory and resource leaks and performance problems.

Linked Process Lists

Linked lists may be used by an operating system to store information about processes. It is known that WINDOWS NT 4.0 and WINDOWS 2000 store process information in a linked process list. Each node of this list may incorporate a further linked thread list as well as additional information about the process that may be useful in debugging a system. For example, in addition to pointers to a thread list, a process list node may include process name, execution priority and execution privileges.

Each node of the thread list contains list pointers to security tokens, context switches, I/O request lists, and wait blocks that can be of interest to service personnel investigating a software bug or other problem. Each node of the thread list of a process node may be linked to additional linked lists of the system.

Prior Debuggers

MICROSOFT Kernel Debugger i386KD (KD) is a symbolic debugger tailored for WINDOWS NT and WINDOWS 2000 kernel and kernel-mode driver debugging. KD is designed for operation through a serial port of a target machine. Two machines are required, the target machine on which the system being debugged is located, having a collection driver, and an analysis machine having a symbol resolution system its and a user interface. Symbol files matching the system being debugged must be present on the analysis machine. Matching symbol files are not automatically located although they are verified as correctly matching the target system. When KD is in use, all other threads on the target machine are stopped until debugging is complete, severely impacting operation of that machine. KD can, however, alter system variables and allow the system to resume operation when debugging is complete.

Statement of the Problem

Collection drivers for symbolic kernel debuggers must run with high privileges in kernel mode. Code run with those privileges poses security and bug risks, so it is desirable that it be small, with few versions.

Since the locations of kernel variables, including process lists, can vary from release to release it is desirable for a debugger to derive this information from symbol files at run time rather than embedding this information in a version-specific collection driver. It is also desirable to place other system-specific information in a command plug-in of the user interface instead of the collection driver.

It is therefore desirable to have a way of specifying system and version specific information, including list format and structure information, to be collected by a collection driver. The collection driver then interprets this specification

SUMMARY OF THE INVENTION

A network-aware, symbolic kernel debugger has been prepared. A local debugger embodiment has a collection driver, user interface, and symbol resolution system all running on the target machine. A remote debugger embodiment has the collection driver on the target machine, with the symbol resolution system and user interface on an analysis machine. A central symbol library debugger embodiment has the collection driver on the target machine, the user interface on an analysis machine, and the symbol files of the symbol resolution system on a symbol reference machine.

It has been found that most "locked-up" WINDOWS NT and WINDOWS 2000 systems have problems with one or more of their keyboard, mouse, and display subsystems, but can still communicate over their network port. On these systems, insufficient virtual memory can prevent users from logging in on the keyboard and display, but network communications may still operate. The remote and central symbol library embodiments take advantage of this fact by using the network port of the target machine for communications between the analysis machine and the collection driver of the target machine.

The user interface is modular. It has a common framework and command line interpreter suitable for debugging several different operating systems on several different platforms, with one or more command plug-ins each suitable for debugging one specific operating system. Each command plug-in has operating system-specific knowledge and related commands. This knowledge includes by way of example and not of limitation knowledge of the format of each node of, and the root symbol name of, the process list. These commands include, for example, commands to display processes, with names, and the threads linked to those processes.

The symbol resolution system of the symbolic kernel debugger has a library of symbol files. This library contains symbol files suitable for several operating system versions that could be found on a target machine. The symbol resolution system automatically identifies the operating system version present on the target machine and locates appropriate symbol files in its library.

The collection driver of the symbolic kernel debugger is operating system specific. It is capable of taking snapshots of the target machine system state according to an input record list provided by the user interface command plug-in. Coherency of each snapshot is enforced through use of an operating system call to suspend execution of all processes and threads other than the collection driver itself for the time it takes to capture the snapshot. After the snapshot is collected, the suspended processes and threads are restarted so that operation can continue. This frequently permits capture of snapshots without visible disruption of system operation.

The foregoing and other features, utilities and advantages of the invention will be apparent from the following more particular description of a preferred embodiment of the invention as illustrated in the accompanying drawings.

BRIEF DESCRIPTION OF THE DRAWINGS

FIG. 9, a block diagram illustrating the structure of captured data as placed by the collection driver in the capture buffer;

FIG. 10, a block diagram of a list buffer descriptor for captured data, showing list buffer element descriptors; and FIG. 11, a block diagram of a list buffer element descriptor and showing how it indicates locations of node data in the capture buffer.

DETAILED DESCRIPTION OF THE EMBODIMENTS

Debugger Architecture

Figure 1:
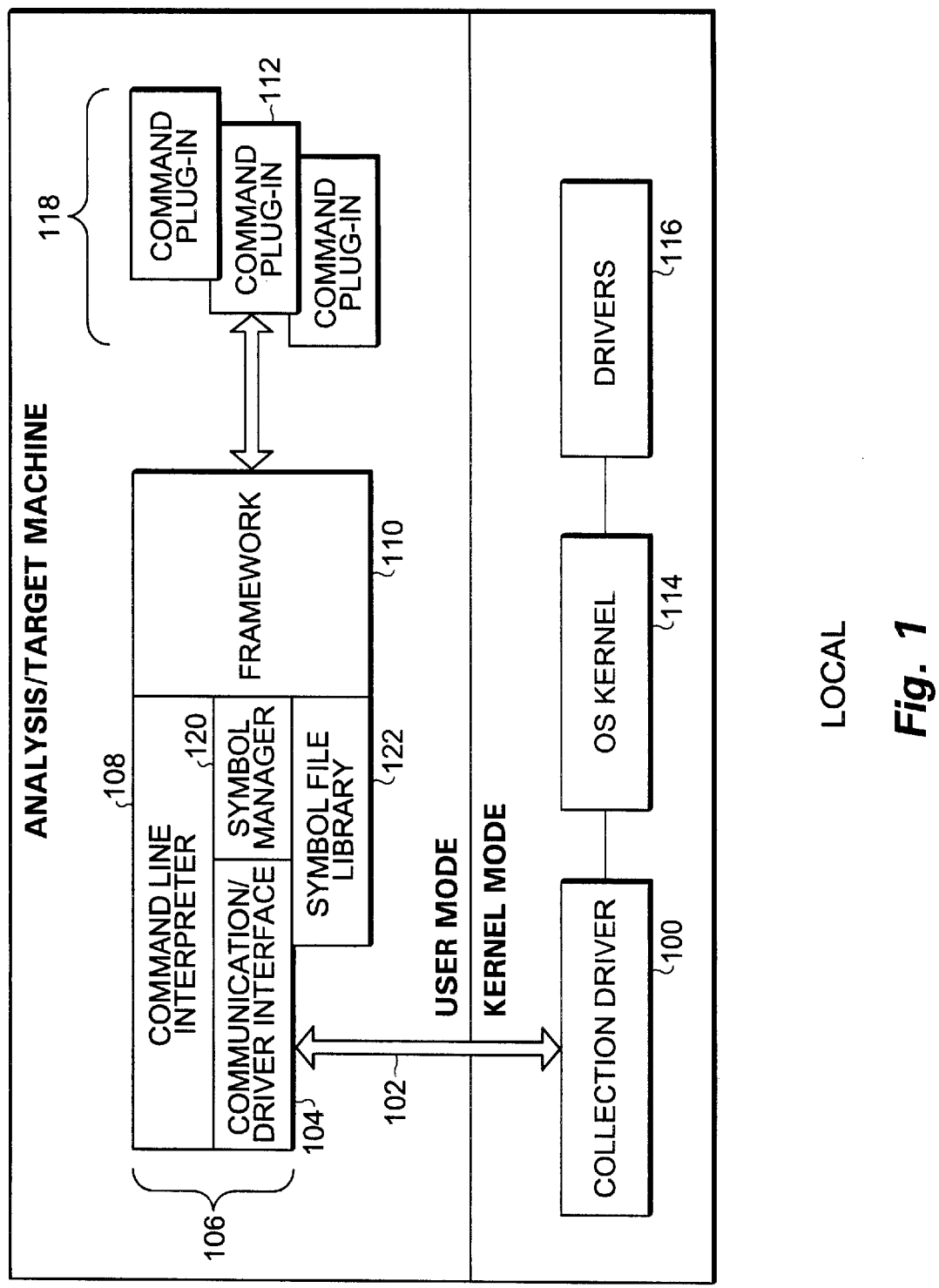
FIG. 1 is a block diagram of the symbolic debugger of the present invention operating with combined analysis and target machines.

A first embodiment (FIG. 1) of the symbolic kernel debugger of the present invention is operable on a single machine, the target machine. This embodiment is useful if the software bug or other problems to be examined do not involve lockup, freezing, or other significant problems with keyboard interface and display subsystems operating on the target machine.

In this embodiment, a collection driver 100 operates in kernel mode on the target machine. Collection driver 100 communicates 102 with a communications and collection driver interface 104 of the user interface 106 operating in user mode. The communications and collection driver interface 104 serves to interface the collection driver with a command line interpreter 108 that receives commands from service personnel, as well as formats and displays data for viewing by service personnel.

The command line interpreter 108 uses framework 110 to interpret commands and control formatting of data according to an executing command plug-in 112 selected as appropriate for the operating system kernel 114 and associated drivers 116 executing on the target machine. The executing command plug-in 112 is selected from a group of available command plug-ins 118 that may include plug-ins suitable for other operating systems; in a particular embodiment the group of available command plug-ins includes plug-ins for use with the Microsoft Windows NT 4.0 and Windows 2000 operating systems.

The command line interpreter 108 expands any symbols referenced by service personnel or by the executing command plug-in 112 through calls to a symbol manager 120. The symbol manager 120 expands these symbols by finding matching symbols in a symbol file of symbol file library 122.

A second embodiment (FIG. 2) of the symbolic kernel debugger of the present invention requires an analysis machine 200 as well as the target machine 202. This embodiment is useful if the bug to be examined do not cripple network operations of target machine 202 even if they involve lockup, freezing, or other significant problems with the target machine's keyboard interface and display subsystems. Analysis machine 200 is coupled to target machine 202 through network interconnect 204. Network interconnect 204 may incorporate any network linkage and router known in the art of local and wide area networks including Fibre-Channel, 10-BaseT or 100-BaseT, and dial-up links such as a RAS (Remote Access) service. It is anticipated that network interconnect 204 may incorporate encrypted communications over the Internet and through suitable firewalls.

In this embodiment, collection driver 206 operates in kernel mode on the target machine 202 to gather data from the operating system kernel (not shown), drivers (not shown) or other programs running on the target machine in manner similar to the collection driver 100 (FIG. 1) of the first embodiment. Collection driver 206 communicates 208 with a target machine communications and collection driver interface 210 that is accessible through a communication service module 212. Communication service module 212 is, in turn, addressable over network interconnect 204 from communications and collection driver interface 214 of the user interface 216 operating in user mode of analysis machine 200.

In a particular embodiment, the same ".DLL" executable code is capable of serving in single or multiple instances as target machine communications and collection driver interface 214, analysis machine communications and collection driver interface 210, and as the stand-alone embodiment's communications and collection driver interface 104.

This communications and collection driver interface 214 serves to interface the collection driver 206 with a command line interpreter 218. Command line interpreter 218 corresponds to the command line interpreter 108 (FIG. 1) of the first embodiment. Command line interpreter 218 (FIG. 2)

receives commands from service personnel, as well as formats and displays data for viewing by service personnel on display apparatus (not shown) of the analysis machine 200.

Command line interpreter 218 uses framework 220 to interpret commands and control formatting of data according to an executing command plug-in 222 selected, as with the first embodiment, as appropriate for the operating system kernel executing on the target machine.

The command line interpreter 218 expands any symbols referenced by service personnel or by the executing command plug-in 222 through calls to a symbol manager 224. Symbol manager 224 expands these symbols by finding matching symbols in a symbol file of symbol file library 226 as with the symbol library 122 of the first embodiment.

A third embodiment (FIG. 3) of the symbolic kernel debugger of the present invention uses a symbol reference machine 300 as well as an analysis machine 302 and target machine 310. Each symbol reference machine 300 may serve more than one analysis machine. Symbol reference machine 300 is coupled to analysis machine (or machines) 302 through network interconnect 304, which may incorporate any combination of local area network, a wide area network, as well as encrypted communications over the Internet and through suitable firewalls as known in the art of virtual private networking. Encrypted communications over the Internet offers particular advantage in that a symbol reference machine 300 may be maintained at a central location while the analysis machine 302 may, but need not, be a notebook computer carried by service personnel to the location of the target machine 310.

In this embodiment, the collection driver 306, operating in kernel mode 308, on the target machine 310 to gather data from the operating system kernel (not shown), drivers (not shown) or other programs running on the target machine 310 in manner similar to the collection driver 206 (FIG. 2) of the second embodiment. Collection driver 306 communicates through a local communications and collection driver interface 312 and communication service module 314 over network interconnect 316 to communications and collection driver interface 318 of analysis machine 302. These components operate similar to the corresponding components of the second embodiment.

In the user interface 340, communications and collection driver interface 318 serves to interface the collection driver 306 with a command line interpreter 320, framework 322, and executing command plug-in 324 that correspond to similar components (FIG. 2) of the second embodiment. Command line interpreter 320 (FIG. 3) receives commands from service personnel, as well as formats and displays data for viewing by service personnel on display apparatus (not shown) of the analysis machine 302.

Command line interpreter 320 expands any symbols referenced by service personnel or by the executing command plug-in 324 through calls to a symbol manager 326. Symbol manager 326 expands these symbols by seeking any matching symbols in a local symbol cache 328. Symbols found in the local symbol cache 328 are expanded with their definition stored therein. Symbols not found in the local symbol cache are formatted into symbol inquiry packets and transmitted over network interconnect 304 to the symbol reference machine 300 for expansion.

Remote symbol manager 330 running on symbol reference machine 300 receives symbol reference packets from one or more analysis machines 302 and expands these by locating appropriate symbols in appropriate symbol files of a symbol file library 332.

Symbol File Library Structure and Operation

Figure 4:
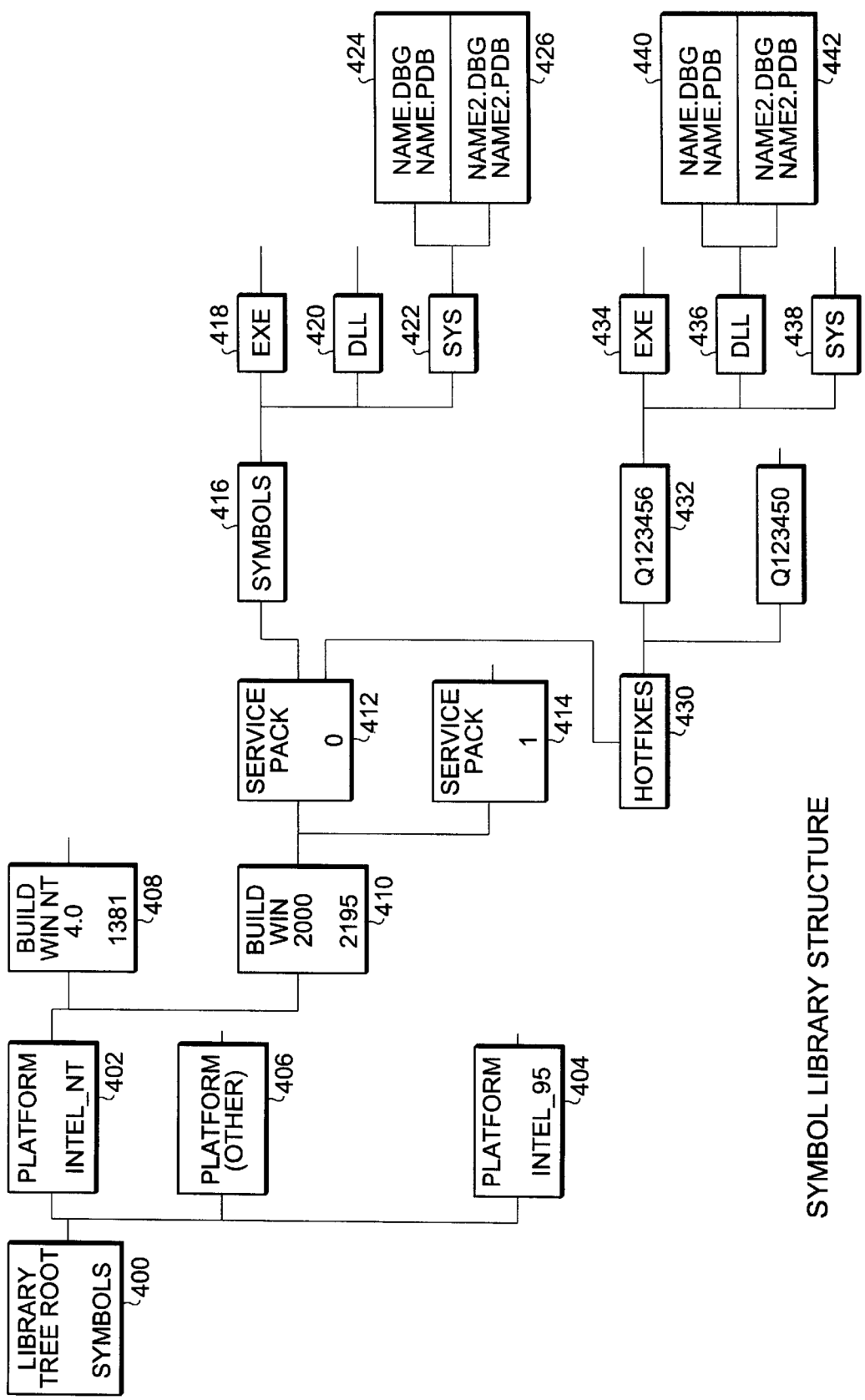
FIG. 4, an illustration of the directory tree structure of the symbol file library.

Symbol file library 332 of the third embodiment, symbol file library 122 of the first embodiment, and symbol file library 226 of the second embodiment have structure as illustrated in FIG. 4. This library is stored on a memory system, such as a disk drive, of the associated machine. The library tree root 400 is a directory named SYMBOLS that appears in a known directory on a storage device, such as a disk drive or RAID cluster. This directory has one or more platform subdirectories, each of which is dedicated to a particular machine architecture and operating system family. For example and not by way of limitation, there may be a platform subdirectory named INTEL_NT 402 for WINDOWS NT and similar operating systems operating on INTEL Pentium type machines, a platform subdirectory named INTEL_95 404 for WINDOWS 96, WINDOWS 98, and WINDOWS Millennium Edition operating on INTEL Pentium machines, and additional platform directories 406 for other machine-system family combinations. Additional platform directories 406 may include directories for Linux running on INTEL machines, for WINDOWS NT running on future INTEL 64-bit machines, and other combinations.

Within a platform directory, such as the INTEL_NT directory 402, there are build number subdirectories for each released build. For example, WINDOWS NT 4.0 has build number "1381", so files related to this version are placed in a subdirectory named "1381" 408. Similarly, WINDOWS "2000" has build number "2195", so files related to this version are placed in a subdirectory named "2195" 410.

Within each build number subdirectory is one or more additional service pack subdirectories, one directory corresponding to each released service pack of the system, with a zero directory for the initial release. For example, service pack subdirectory "0" 412 and service pack subdirectory "1" 414 may exist in build subdirectory "2195" 410. Within each of these service pack subdirectories is another subdirectory, a service pack symbols directory, named SYMBOLS, such as the service pack symbols directory for service pack 0 of Windows "2000" 416.

Within each service pack symbols directory, such as service pack symbols directory 416, are three symbol file subdirectories named "EXE" 418, "DLL" 420, and "SYS" 422. The "EXE" subdirectory contains symbol files associated with kernel mode and driver executable files ending in the ".EXE" suffix, the "DLL" subdirectory contains symbol files associated with kernel mode and driver executable files ending in the ".DLL" suffix, and the "SYS" subdirectory contains symbol files associated with kernel mode and driver executable files ending in the ".SYS" suffix. These In, symbol files may include ".DBG" and ".PDB" files generated when corresponding executable files are compiled, such as symbol files 424 and 426.

Within the service pack subdirectory, such as service pack subdirectory "0" 412, there is also a subdirectory named HOTFIXES 430 that may contain one or more hotfix subdirectories corresponding to hotfixes or in-line fixes applicable to a particular service pack of a system release. Each hotfix subdirectory, such as hotfix subdirectory Q123456 432, has a name corresponding to the hotfix release. Within the hotfix subdirectory are three symbol file subdirectories named "EXE" 434, "DLL" 436, and "SYS" 438. The "EXE" subdirectory contains symbol files associated with kernel mode and driver executable files ending in the ".EXE" suffix, the "DLL" subdirectory contains symbol files associated with kernel mode and driver executable files ending in the ".DLL" suffix, and the "SYS" subdirectory contains symbol files associated with kernel mode and driver executable files ending in the ".SYS" suffix. These symbol files may include ".DBG" and ".PDB" files generated when corresponding executable files are compiled, and made available by the system vendor, such as symbol files 440 and 442. ".DBG" files are often available from MICROSOFT for use with both WINDOWS NT and WINDOWS 2000, while ".PDB" files are available for WINDOWS 2000 but not for WINDOWS NT.

Figure 2:
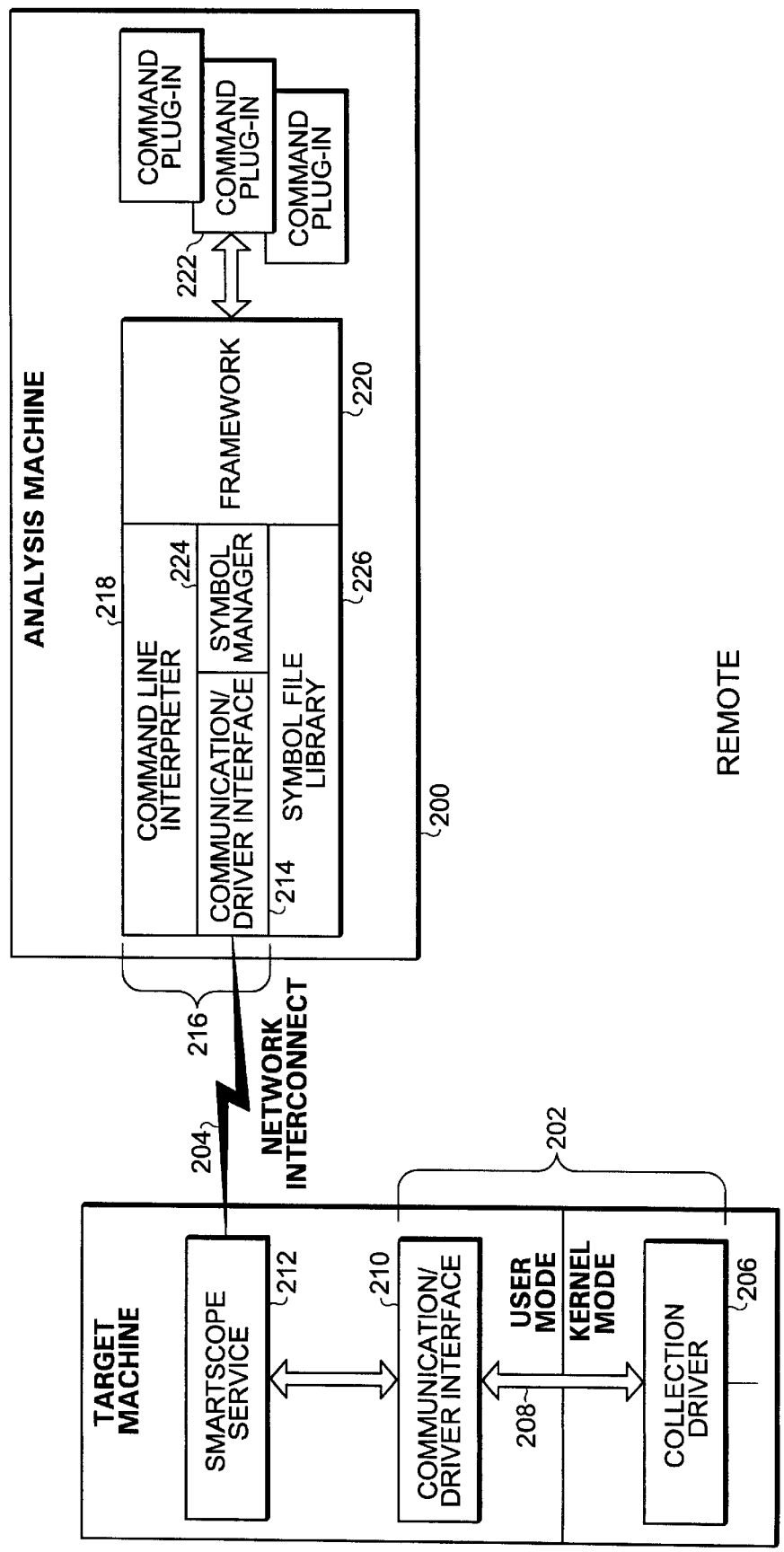
FIG. 2, a block diagram of the symbolic debugger of the present invention operating with separate analysis and target machines.
Figure 3:
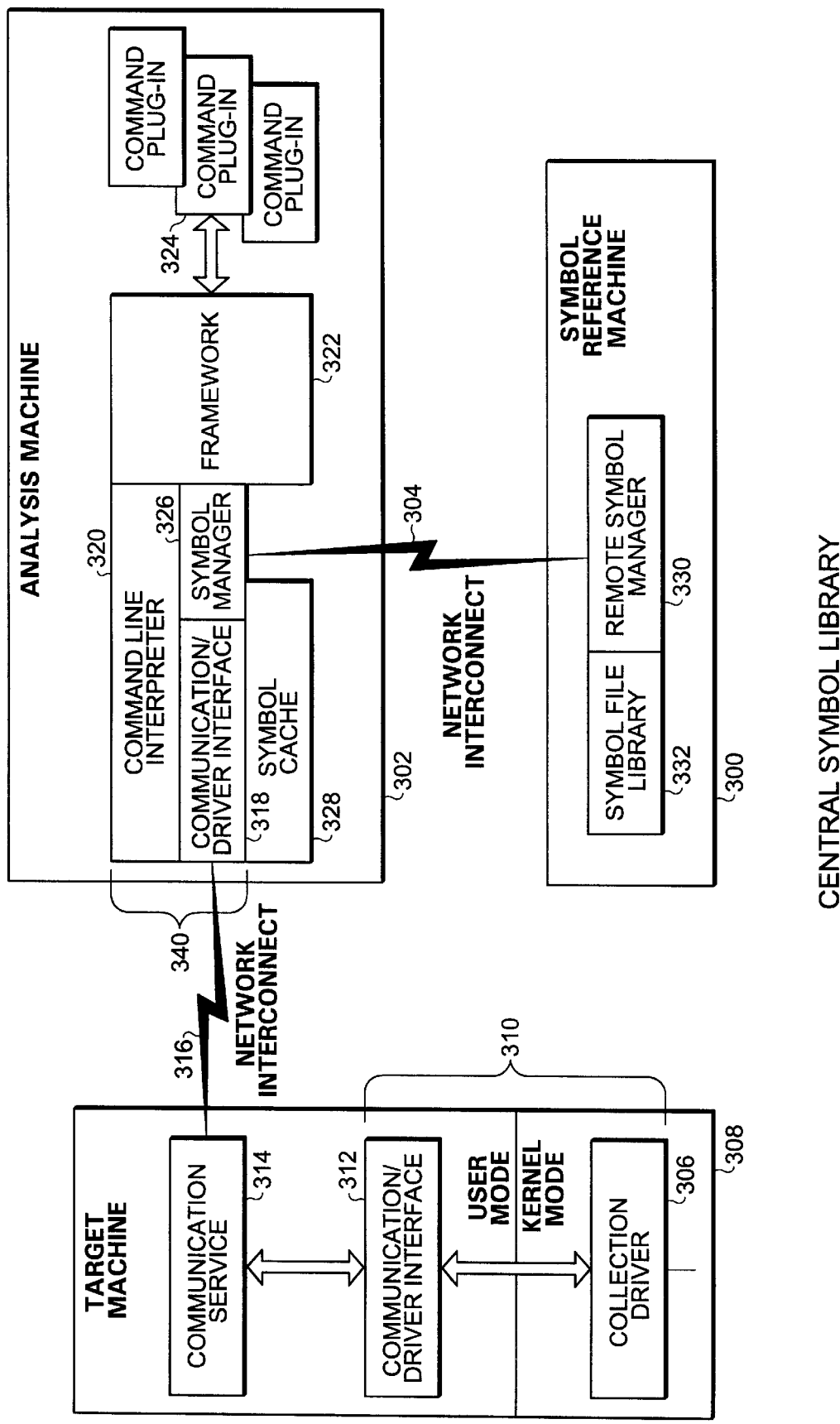
FIG. 3, a block diagram of the symbolic debugger of the present invention operating with separate analysis and target machines and a separate symbol file library machine.
Figure 5:
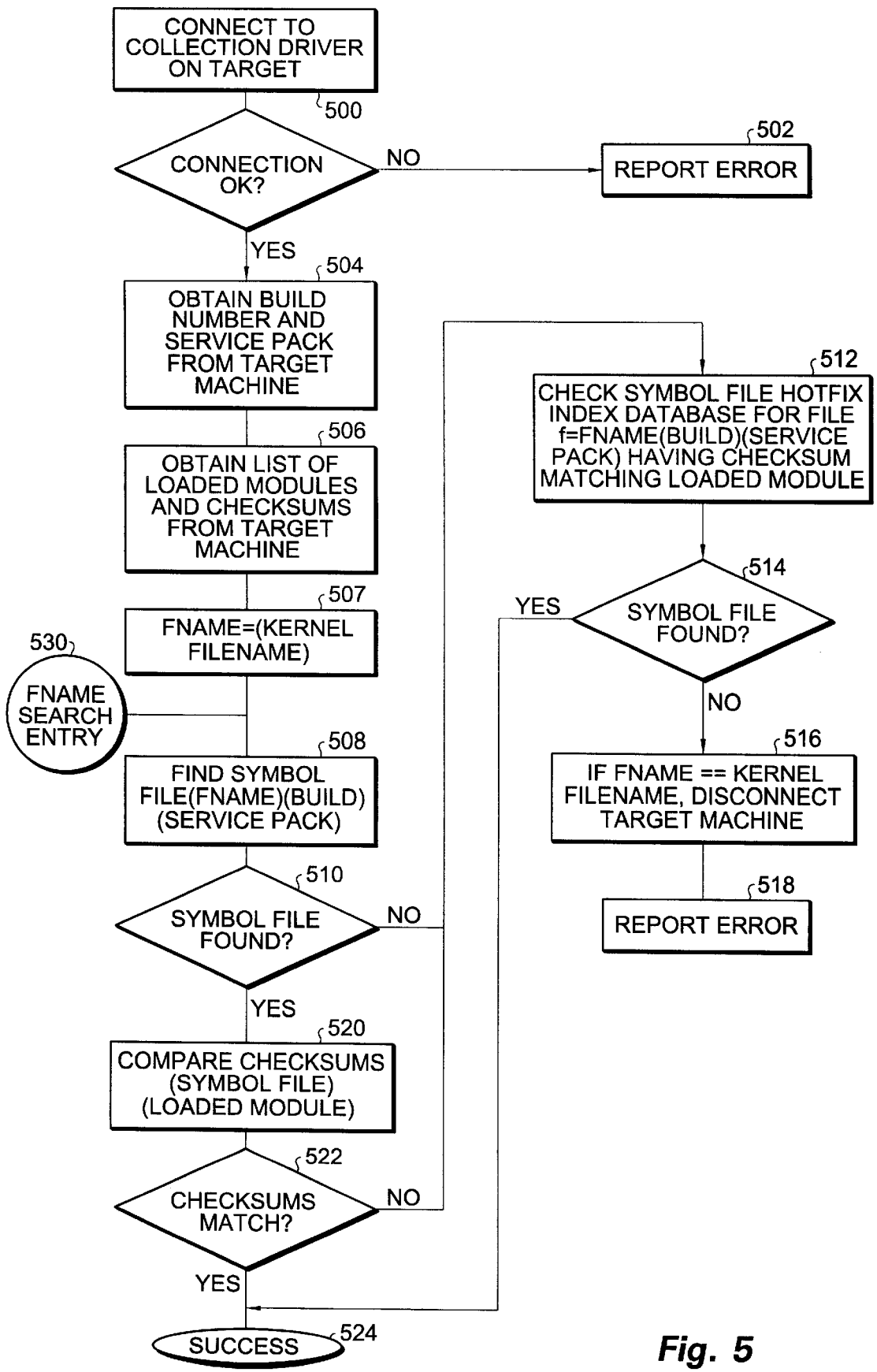
FIG. 5, a flowchart of the symbol library tree search performed for a symbol file when the debugger initializes for a particular target machine.

When the an embodiment as illustrated in FIG. 1, 2, or 3, initializes for a particular target machine, any required network connection to the target machine is set up, the collection driver and communication service if required for that platform is started, and user interface 106, 216, or 340 of the debugger connects 500 (FIG. 5) through to the collection driver. If connection was unsuccessful, an error is reported 502 and operation ceases. If connection was successful, the build number and service pack number, or other version identifying information, is obtained 504 by the collection driver from the operating system of the target machine and returned to the user interface. A list of loaded executable modules on the target machine is also obtained 506, this list includes module names and checksums of the corresponding executable files. The build number and service pack number, or other version identifying information of the operating system, is used to ensure a compatible command plug-in 112, 222, or 324 is loaded, and used to locate symbol files in the library tree structure.

Once the version identifying information is read from the system running on the target machine, the symbol file for the operating system kernel is searched for in the symbol library structure. For example, if the platform is INTEL_NT, build number is "2195", and service pack number is "0", symbol manager 120 or 224, or remote symbol manager 330, finds the SYMBOLS subdirectory 416 (FIG. 4) of service pack directory 412 of build directory 410 of platform directory 402 of the library tree root 400.

The operating system kernel file name is known to the symbol manager 120, 224, or 326 (for WINDOWS NT and WINDOWS 2000 this name depends on the number of processors in the machine). This filename is set 507 as the symbol file to locate and a symbol file of this name having a symbol file suffix is sought 508 in the appropriate "EXE" 418, "SYS" 422, or "DLL" 420 subdirectory.

Each ".DBG" or ".PDB" symbol file has an indicator of the checksum of the corresponding executable file. These checksums for hotfix executables are entered into a small database of symbol file names and locations that can be accessed by module name, build number, service pack number, and checksum. If no symbol file is found 510, then this database is checked 512 for a matching file. If a kernel symbol file is found at this point, it is a hotfix symbol file located somewhere under the HOTFIXES directory 430. If 514 no symbol file is found, and the file being sought is the kernel symbol file then the user interface disconnects 516 from the target machine and reports an error 518.

If a symbol file was found, the checksum indicated in the symbol file is compared 520 with the checksum for that module obtained with the list of loaded modules on the target machine. If 522 these checksums match, success is declared 524, the symbol file is loaded, and the user interface awaits a user command.

If the checksums do not match, the symbol file hotfix index database is checked 522 for a symbol file having the same module name, build, service pack, and checksum, and the associated symbol file is read. This symbol file is located in an appropriate "EXE" 434, "SYS" 438, or "DLL" 436 subdirectory of a hotfix directory. If 514 one is found, success is declared 522, the symbol file is loaded, and the user interface awaits a user command.

As debugging progresses, it may be found necessary to locate additional symbol files corresponding to other modules. This is done by reentering 530 the above sequence to search for a symbol file having an appropriate filename, including 508, 510, 512, 514, 518, 520, 522, and 524 for those modules.

Most hotfix releases include updated versions of some, but not all, operating system executables and corresponding symbol files. The symbol file library stores complete copies of all operating system symbol files for each build and service pack. It also stores symbol files updated in each hotfix. Those symbol files corresponding to modules not updated in a particular hotfix are located in the complete build and service pack directories. The symbol library search method of the present invention will locate any matching file, whether it be in a hotfix directory or in a build and service pack directory.

If more than one analysis machines 302 (each coupled to a target machine) are in use and connected to a single remote symbol manager 330, remote symbol manager 330 maintains a separate list of opened symbol files for each analysis and target machine combination. This permits the remote symbol manager 330 to respond to expansion requests with symbols appropriate to the operating system version, service pack, or hotfix, installed on each target machine.

Collection Driver Input Record List

The input record list specifies information to be captured by the collection driver.

When the command line interpreter 108, 218, or 320, requires data from the target machine, it creates an input record list and transmits this list to the collection driver. The input record list specifies information for the collection driver to gather from the operating system on the target machine. The collection driver gathers the desired information according to this list, places the information in the capture buffer, and copies the capture buffer to the command line interpreter.

System Data Structures to be Captured

It is known that much of the system data of interest to service personnel debugging a WINDOWS 2000 or WINDOWS NT is in linked lists. Additional system data of interest may be in scalar variables.

A particular symbol 600 (FIG. 6) can be resolved by the symbol resolution system to determine an address of the process list head 602 in target machine memory. This list head 602 contains pointers to links 604 in each process node, such as process node 606; these lists are doubly linked such that links include a forward and reverse link. Links 604 may point to links 608 in other process nodes 610 and 612 as known in the art. Process nodes contain process identity information 614, priority information 616, and other information that can be of interest in debugging.

Process nodes, such as process nodes 606 and 610, may contain a thread list head 618 containing pointers to links 620 in a list of thread (ETHREAD in Microsoft parlance) nodes such as node 622. For example and not by way of limitation, note that thread nodes 622 and 624 are linked to process node 606, and thread node 626 are linked to process node 610. Each thread node corresponds to a thread that exists in the system and may contain information of interest in debugging such as thread identity 630, wait block list head 632, and an I/O request list head 634.

Input Record List Structure

The input record list has a header 700 (FIG. 7), a count of records in the list 702, one or more record offsets 704 and 706 for locating records in the list, and one or more records 708 and 710. Each record, such as record 708, of the input record list begins with a record signature 712, which is a constant that can be used to confirm the starting point of a record. Each record also has a descriptor type 714 that indicates the type of a following memory descriptor 716.

The memory descriptor 716 may be of several types as indicated by the descriptor type 714, including a scalar memory descriptor and a list memory descriptor. A scalar memory descriptor contains an address 800 (FIG. 8A) and a length 802 of data to be captured. This scalar memory descriptor type is useful for capturing scalar values located at symbolically locatable locations in memory of the target machine.

The list memory descriptor has a count of list element descriptors 820 (FIG. 8B), followed by one or more list element descriptor offsets 822 and 824. Each list element descriptor offset may be used to locate an associated list element descriptor, offset 822 indicates a location of list element descriptor 826 and offset 824 indicates a location of list element descriptor 828.

Figure 6:
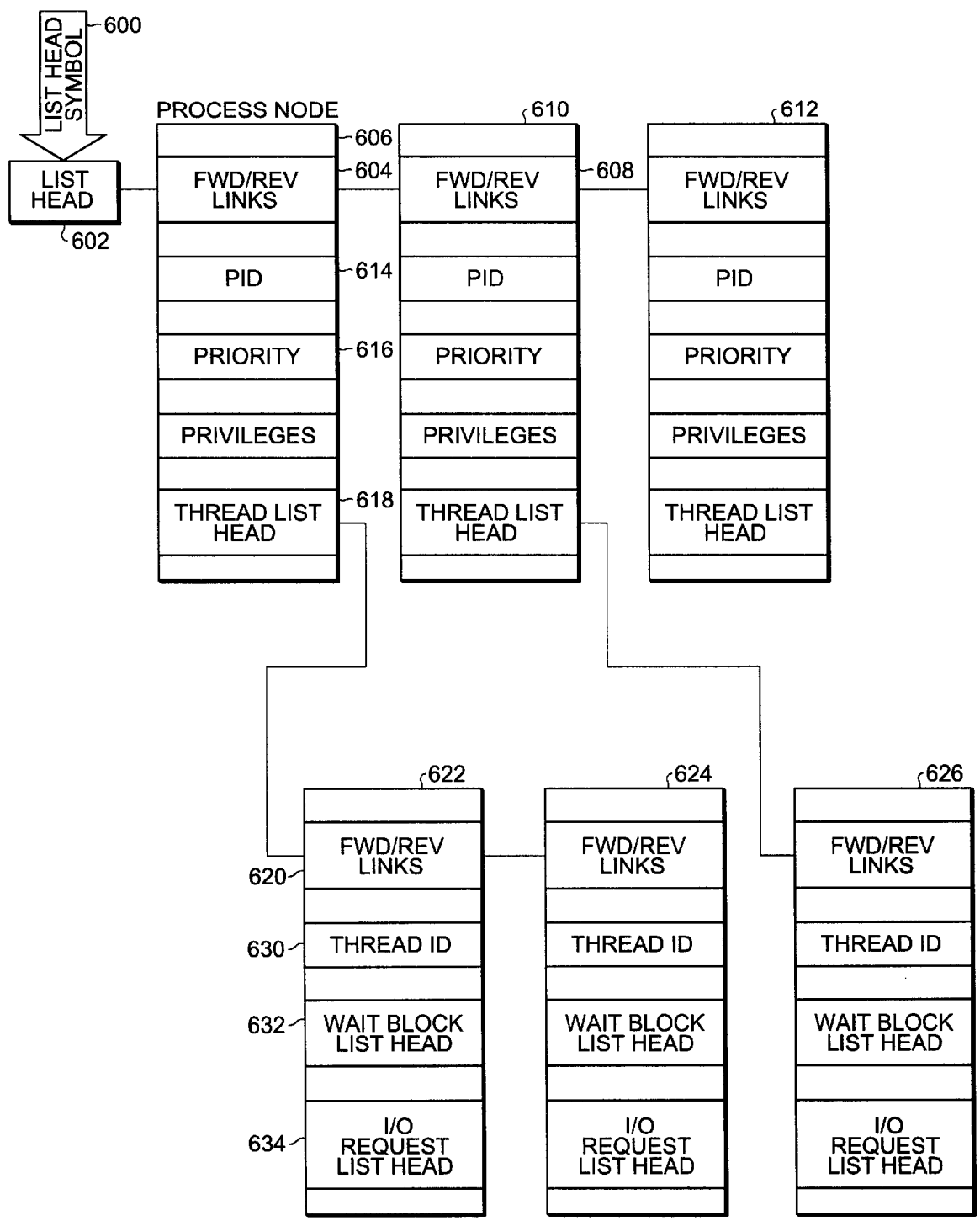
FIG. 6, an illustration of the structure of process and thread lists in WINDOWS NT & WINDOWS 2000.

Each list element descriptor has a list type 840 (FIG. 8C), which indicates a type of linkage used by the list having data to be captured, which may have the structure of FIG. 6. For example, the list type 840 may indicate whether the list is singly linked, doubly linked, or singly linked with an element count.

The list element descriptor also has a link offset 841 that indicates the position of the links associated with the particular linked list in a node. Further, this offset permits list constructs, such as used in Microsoft operating systems, that have links at locations other than at the beginning of each node.

Each list element descriptor also has a list head type 842, which indicates whether its list head locator 844 represents a location in system memory or an offset into a node of a parent list. It also has a node count limit 846 indicating a maximum number of list nodes from which data will be captured by the collection driver, a tag count 848 indicating how many portions of each node will be captured, and one or more tags in a tag array 850. There is also a list identifier 852 that is copied into the capture buffer to identify data captured according to a particular list element descriptor.

The collection driver can follow the list head locator 844 to find the list head in target system memory. The driver can then follow the list to each node in succession by interpreting links of the list according to the list head type 842. Once a node of the list is located, the driver can interpret the tags of the tag array 850 to identify the data to be captured from that node. Similarly, the driver can locate the heads of additional lists in the node as specified by subsequent list element descriptors, follow those heads to nodes of those lists, and capture data from those nodes.

Each tag has an offset 870 (FIG. 8D) and a length 872 indicating a portion of a list node to be captured.

Input Record List Operation

Assume by way of example and not of limitation that the user interface wants a snapshot comprising a thread count from a scalar variable, and thread and process identification information from a WINDOWS NT or WINDOWS 2000 process list.

The user interface, including the command plug-in, will cause construction of an input record list containing at least three records. With reference to FIGS. 7, 8A, 8B, 8C, and 8D, a first record 708 of scalar memory descriptor type is placed in the input record list specifying an address 800 and length 802 of the thread count scalar variable. A second record 710 is constructed having a list memory descriptor type 730 and suitable memory descriptor 732.

The memory descriptor 732 for this operation specifies that it has two list element descriptors 826 and 828. The first of these list element descriptors 826 is used to specify the process list, the second of these list element descriptors 828 is used to specify the thread list appurtenant to the process list.

With reference to FIGS. 6, 8B, 8C, and 8D, list element descriptor 826 list head type 842 is marked to indicate that the list head locator 844 specifies the location in system memory of the process list head 602. An entry is made in the tag array 850 to specify an offset 870 and length 872 of a tag corresponding to the process identifier location 614 in each process node. A node count limit 846 is set to prevent capture buffer overflow.

The second list element descriptor 828 is marked to indicate that its list head locator 844 specifies a location in a node of a parent list instead of a node in memory. The list head locator 844 specifies the offset of the thread list head 618 in a process node, such as process node 616. The node count limit 846 is set to a reasonable value to prevent freezing of the system should a circular list be found, and a tag array 850 entry is made having the offset 870 and length 872 of the thread identification 630 of a thread list node, such as node 622. Offset 870 of the thread list head is derived from information in header files compiled into the command plug-in of the user interface. The locations of the process list header 844 is derived from information in an associated symbol file previously extracted from the symbol file library.

Once assembled, the input record list is transmitted to the collection driver. The collection driver 100, 206, or 306, then uses a system call to briefly suspend execution of all threads running on the target machine except itself, interprets the input record list while copying a snapshot of system data to the capture buffer, and uses another system call to restart execution of the suspended threads.

On a single processor machine, it may be sufficient to disable processor interrupts before capturing the system information, re-enabling interrupts afterwards. On multiple processor machines having shared memory it is necessary to temporarily stop execution of threads on additional processors. The collection driver as built for WINDOWS NT and WINDOWS 2000 suspends execution of all other threads with the KeContextToKframes and KeFreezeExecution system calls, and resumes execution with the KeThawExecution call.

This capture process takes about twenty milliseconds on a 400 Mhz Pentium-class machine for a typical snapshot of the many elements of system data required by a practical symbolic kernel debugger. Since execution is resumed following the brief capture process, the target machine may continue operation. The capture process is brief enough that many, but not all, real-time control programs and drivers may be debugged without disrupting the system being controlled.

Capture Buffer Format

Figure 7:
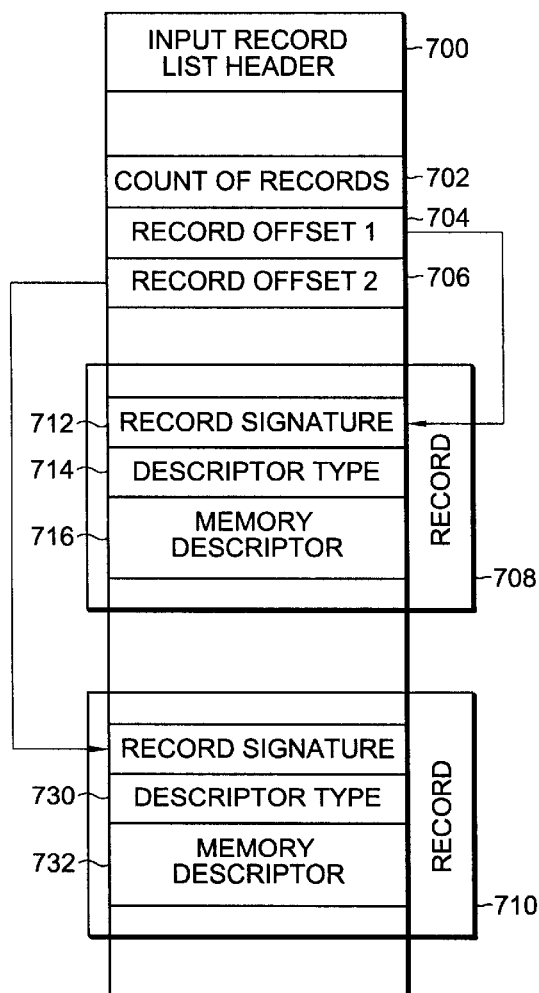
FIG. 7, a block diagram of an input record list as interpreted by the collection driver of the symbolic kernel debugger.
Figure 8A:
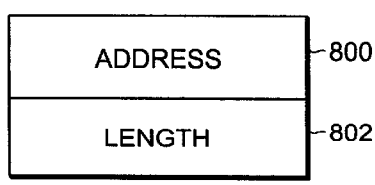
FIG. 8A, a block diagram of a memory descriptor for a scalar type that may appear in the input record list of FIG. 7.
Figure 8B:
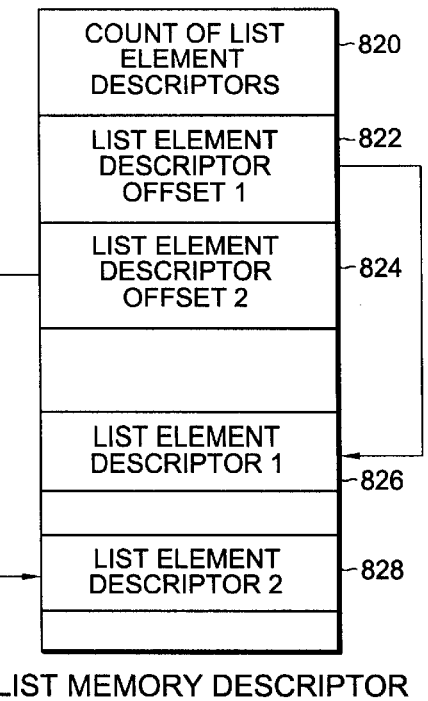
FIG. 8B, a block diagram of a memory descriptor for a list type that may appear in the input record list of FIG. 7.
Figure 8C:
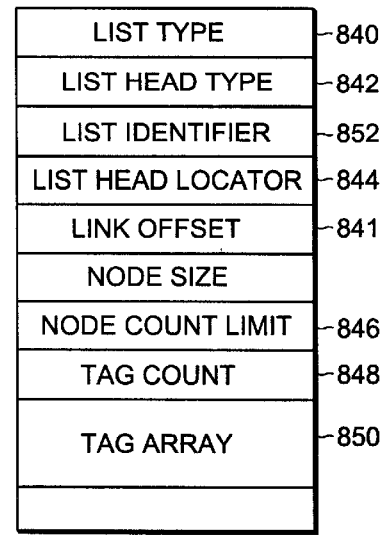
FIG. 8C, a block diagram of a list element descriptor that may appear in the list memory descriptor of FIG. 8B.
Figure 8D:
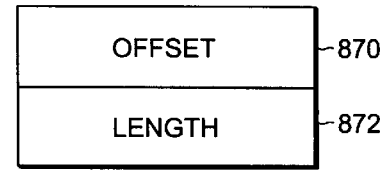
FIG. 8D, a block diagram of a tag array element that may appear in the tag array of the list element descriptor of FIG. 8C.

System data gathered by the collection driver is placed in the capture buffer with structure as illustrated in FIG. 9. The buffer contains a count 900 of the number of records in the buffer, and offsets 902 and 904 indicating locations of records in the buffer. With reference to FIGS. 7, 8A, and 9, each record, such as records 906 and 908, contains a record signature 910, a result flag 912, a capture type 914, a buffer descriptor 916, and data 918.

When data is captured according to a record of scalar data descriptor type, the capture type 914 of the corresponding record is marked with a scalar buffer descriptor type and the buffer descriptor 916 is set to the address 800 and length 802 of the data 918 in the buffer.

Similarly, when data is captured according to a record of list descriptor type, the capture type 914 of the corresponding record is marked with a list buffer descriptor type.

If the capture type 914 is list buffer descriptor type, the buffer descriptor 916 has structure as illustrated in FIG. 10. It comprises a count 1000 of list buffer element descriptors and one or more list buffer element descriptor offsets 1002. Each list buffer element descriptor indicates the location of a list buffer element descriptor, such as element descriptors 1004 and 1006, in the buffer.

Each element descriptor, such as element descriptor 1004, in turn has structure according to FIG. 11. Each list buffer element descriptor has the number of nodes captured 1100 at this level of the list, the size of each node 1102 as captured (after the requested tag operations limit the amount of information captured from the node), a result flag 1104 indicating whether capture was successful, and a data offset 1106 indicating the location of the first captured node data in the record.

SUMMARY

The collection driver therefore is capable of capturing a coherent snapshot of critical system data in the capture buffer based on the input record list. Once captured, the capture buffer is dispatched to the user interface for interpretation, formatting, and display.

The embodiments have been described with particular reference to a symbolic kernel debugger for debugging software bugs and other problems with the MICROSOFT WINDOWS NT and WINDOWS 2000 operating systems. The principles of the kernel debugger can be utilized in symbolic kernel debuggers for debugging on other operating systems including by way of example the MICROSOFT WINDOWS 98 and WINDOWS Millennium Edition, as well as operating systems from other vendors including Unix and Unix-derived operating systems such as SOLARIS, Tru-64 Unix, and Linux.

The embodiments have been described with reference to a particular symbol file library tree structure. It is anticipated that the invention will be operable with other symbol file library structures searchable by operating system version information, such a build number and service pack number.

It is also anticipated that the invention will be operable with alternative ways of verifying that a located symbol file matches a loaded module of the operating system. Verification in the described embodiments is done with the checksum matching process discussed above, the checksum serving as file tagging information. Verification can also be accomplished through comparison of alternative tagging information such as a timestamp, a hash function of corresponding source code, or both, should these tags be incorporated into the executable and symbol files.

A presently preferred embodiment of the present invention and many of its improvements have been described with a degree of particularity. It should be understood that this description has been made by way of example, and that the invention is defined by the scope of the following claims.

A computer program product is any machine-readable media, such as an EPROM, ROM, RAM, DRAM, disk memory, or tape, having recorded on it computer readable code that, when read by and executed on a computer, instructs that computer to perform a particular function or sequence of functions. A computer having the code loaded on it includes a computer program product because it incorporates DRAM and/or disk memory having the code recorded in it. It is anticipated that the debugger of the present invention will be distributed as a program product.

A presently preferred embodiment of the present invention and many of its improvements have been described with a degree of particularity. It should be understood that this description has been made by way of example, and that the invention is defined by the scope of the following claims.

What is claimed is:

1. A collection driver program product for accessing data of named executable modules of an operating system executing on a target machine, the operating system having version information, the collection driver program product comprising computer readable code stored on computer readable media, the computer readable code comprising code for:

receiving an input record list from the requestor containing records describing data to be captured;

suspending execution of all threads running on the target machine except the collection driver program;

interpreting the input record list and collecting operating system data specified by the input record list into a capture buffer;

restarting execution of the suspended threads; and transmitting the capture buffer to the requestor.

2. The collection driver program product of claim 1, wherein the code for interpreting an input record list includes code for interpreting a list memory descriptor that specifies a list head and tag information specifying data to gathered from nodes of a linked list.

3. The collection driver program product of claim 1, wherein the code for interpreting an input record list includes code for interpreting a scalar memory descriptor.

4. The collection driver program product of claim 3, wherein the code for interpreting an input record list includes code for interpreting a list memory descriptor that specifies a list head and tag information specifying data to gathered from nodes of a linked list.

5. The collection driver program product of claim 1, wherein the code for interpreting an input record list includes code for interpreting a list memory descriptor of the input record list that specifies information to be gathered from nodes of a linked list having a list head located in a node of a parent list, a list head of the parent list being specified by the list memory descriptor.

6. The collection driver program product of claim 5, wherein the code for interpreting the input record list and collecting operating system data specified by the input record list into a capture buffer includes code for marking formatted data in the capture buffer with scalar buffer descriptors and list buffer descriptors.

7. The collection driver of claim 5, wherein the computer readable code for receiving an input record list from the requestor is capable of receiving an input record over a network connection from a second machine, and computer readable code for, upon request, reading the version information from the operating system executing on the target machine and returning this version information to a requestor.

8. A collection driver for collecting data from memory of a computer system comprising computer readable media having recorded therein computer readable code for:

receiving a record list, the record list comprising at least a first list element descriptor descriptive of data to be retrieved from a first linked list;

suspending execution of threads running on the computer system except the collection driver;

following a list head locator of the list element descriptor to a head of the first linked list;

following links of the head of the first linked list to a first node of the linked list;

interpreting at least one tag of the first list element descriptor to locate data of the node;

extracting data from the node; and restarting execution of the suspended threads automatically upon completing the extracting.

9. The collection driver of claim 8, wherein:

the record list further comprises a second list element descriptor descriptive of data to be retrieved from a second linked list, and wherein a node of the first list contains a head of the second list; and the computer readable code further comprises code for:
following a list head locator of the second list element descriptor to a second list head of the node of the first linked list;
following links of the second list head to a node of the second linked list; and
extracting data from the second linked list.

10. A method of debugging a computer, comprising:

running a collection driver on the computer;

receiving with the collection driver an input record list;

using a first operating system call to suspend execution of all processes and threads other than the collection driver running on computer;

capturing a snapshot of the computer based on the input record list;

upon completion of the capturing, using a second operating system call to restart execution of the suspended processes and threads, whereby operation of the computer is only interrupted for a period of time required to complete the capturing.

11. The method of claim 10, wherein the period of time is less than about 20 milliseconds.

12. The method of claim 10, wherein the capturing includes collecting operating system data specified by the input record list, the operating system data specifying one of a set of operating system types.

13. The method of claim 10, wherein the input record list comprises at least a first list element descriptor descriptive of data to be retrieved from a first linked list and wherein the capturing includes:

following a list head locator of the list element descriptor to a head of the first linked list;

following links of the head of the first linked list to a first node of the linked list;

interpreting at least one tag of the first list element descriptor to locate data of the node; and extracting data from the node.

* * * * *